United States Patent [19]

Bos et al.

[11] 4,011,692

[45] Mar. 15, 1977

[54] METHOD OF AND DEVICE FOR GRINDING GROOVES

[75] Inventors: Jules Bos; Günter Von Der Kall, both of Rijswijk, Netherlands

[73] Assignee: U.S. Philips Corporation, New York, N.Y.

[22] Filed: June 26, 1975

[21] Appl. No.: 590,437

[30] Foreign Application Priority Data

July 5, 1974 Netherlands .................... 7409107

[52] U.S. Cl. .................................. 51/323; 51/283; 51/206 P; 29/603; 360/122; 360/126
[51] Int. Cl.² ...................... B26B 1/00; H01F 7/00
[58] Field of Search .......... 29/603; 51/281 R, 283, 51/286, 206 P, 323; 125/12, 16 R, 21 R; 360/122, 126

[56] References Cited

UNITED STATES PATENTS

| | | | |
|---|---|---|---|
| 3,440,360 | 4/1969 | Sugaya | 360/122 X |
| 3,478,732 | 11/1969 | Clark | 125/12 |
| 3,516,153 | 6/1970 | Schneider | 29/603 |
| 3,845,550 | 11/1974 | Gooch | 29/603 |
| 3,846,906 | 12/1974 | Case | 29/603 |
| 3,918,151 | 11/1925 | Bol | 29/603 |

FOREIGN PATENTS OR APPLICATIONS 83,010  4/1919  Switzerland ............... 51/206 P

*Primary Examiner*—Gary L. Smith
*Attorney, Agent, or Firm*—Frank R. Trifari; Robert S. Smith

[57] ABSTRACT

A method of grinding fine grooves in workpieces of a ceramic material with wires disposed in grooves on the outer circumference of a rotatable drum. A part of the cross-section of each wire extends above the circumferential face of the drum.

This grinding method is used to produce magnetic head cores in conjunction with various joining and severing steps.

4 Claims, 5 Drawing Figures

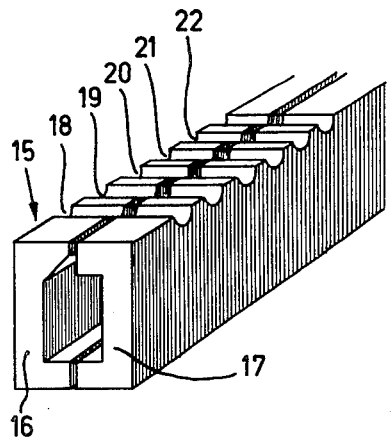
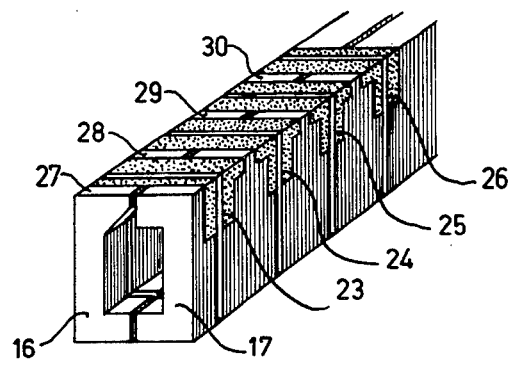
Fig. 2a        Fig. 2b
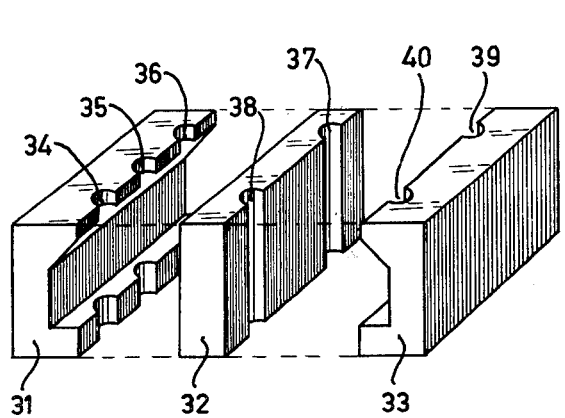
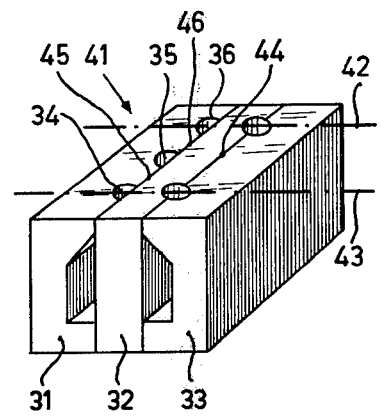
Fig. 3a        Fig. 3b

METHOD OF AND DEVICE FOR GRINDING GROOVES

The invention relates to a method of providing a number of shallow mutually parallel grooves in workpieces of a particular ceramic material.

Such a method is used, for example, in the manufacture of magnetic heads of ferrite for the accurate definition of the track width.

For some time, advanced servomechanisms have been used notably in digital magnetic recording technology, as used, for example, in disk memories, with which a magnetic head can be continually adjusted accurately on a written track. This makes it possible to increase the track density (tracks per inch = tpi). The state of the art is a density is 200 tpi announcements have been made of 400 and 600 tpi and considerably higher densities may be expected in future. Of course this development requires heads having narrow, very accurately defined track widths. It is known to produce such small track widths in ferrite by providing at the area of the gap of the magnetic head shallow grooves between which the effective gap extends. For this reduction of the track width see, for example, the British patent specifications Nos. 1,340,422 and 1,325,239, as well as the U.S. Pat. No. 3,440,360. With the present day methods, however, it is very difficult to satisfy the required tolerances in cases of track widths, for example, of 10 microns. The conventional sawing of the grooves gives rise to inaccuracies due to swinging of the sawing tools and crumbling away of the very brittle ferrite material.

It is an object of the invention to provide a method which does not exhibit the above-mentioned drawbacks. For that purpose, the method according to the invention is characterized in that the grooves are ground by pressing the workpiece in question against a rotating drum on the outer circumference of which at least one metal wire is stretched in at least one circumferential groove in such manner that it projects above the surface with a part of its cross-section. As compared with the use of normal wire sawing machines, in which the wires are stretched freely, the method according to the invention has the advantage that the wires are supported in that they are stretched in grooves on a drum which can be accurately turned and journalled for vibration free rotary movement. The grooves preferably have a V-shaped cross-section.

As regards the manufacture of cores for magnetic heads, the method according to the invention may be used both in the gap reduction method as described in the said British patent specification No. 1,325,239, in which the grooves are made in a gap bounding surface, and in the method as described in the British patent specification No. 1,227,061 in which the grooves are made in the bearing surface.

A first preferred embodiment of the method according to the invention therefore relates to a method of manufacturing the core for a magnetic head and comprising the following steps:

providing a number of mutually parallel grooves in a surface of a first block of ferrite;

connecting the grooved surface to a surface of a second block of ferrite by means of a non-magnetic material; severing the resulting assembly into individual head cores by making sawcuts extending parallel to the grooves;

which method is characterized in that the grooves are ground by pressing the first block against a rotating drum on the outer circumference of which at least one metal wire is stretched in at least one circumferential groove in such manner that it projects above the surface with a part of its cross-section.

A second preferred embodiment of the method according to the invention relates to a method of manufacturing a core for a magnetic head and comprising the following steps:

connecting together a surface of a first block of ferrite to a surface of a second block of ferrite by means of a non-magnetic material;

providing in the resulting assembly a number of mutually parallel grooves extending transversely to the connection surfaces;

severing the resulting assembly into individual head cores by making sawcuts extending parallel to the grooves;

which method is characterized in that the grooves are ground by pressing the assembly of blocks against a rotating drum on the outer circumference of which at least one metal wire is stretched in at least one circumferential groove in such manner that it projects above the surface with a part of its cross-section.

The invention also relates to a device for grinding shallow mutually parallel grooves in workpieces of in particular ceramic material, as well to a core for a magnetic head manufactured while using one of the above-mentioned methods.

The invention will be described in greater detail, by way of example, with reference to the drawing.

FIGS. 2a and 2b show a multitrack magnetic head during various stages of the method according to the invention.

FIGS. 3a and 3b show a "tunnel erase" magnetic head during various stages of the method according to the invention.

Figure 1:
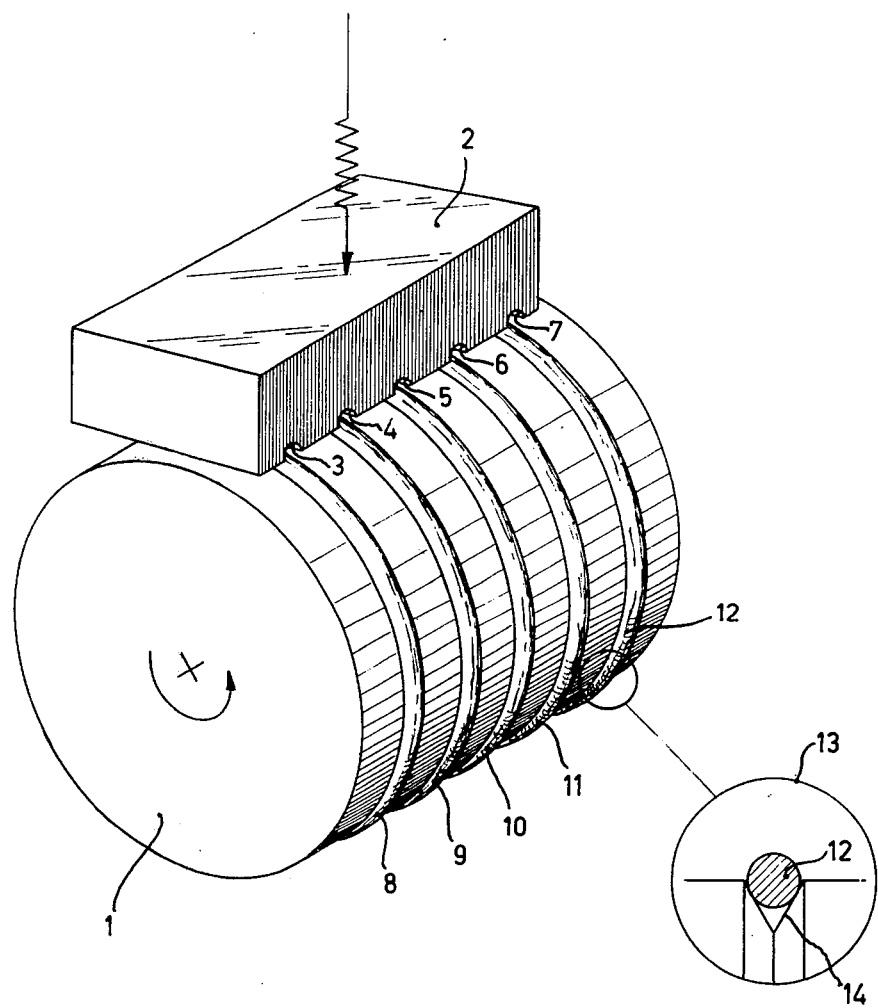
FIG. 1 shows a device for grinding grooves according to the invention.

The device shown in FIG. 1 consists of a particular type of wire sawing machine. In the normal types of wire sawing machines, the wires are stretched freely. In the wire sawing machine according to the invention the wires 8, 9, 10, 11 and 12 are supported, however, by stretching them in grooves on an accurately turned drum 1 which is journalled for vibration free rotary movement. Grinding is carried out by pressing the workpiece 2 against the rotating drum 1 while adding an abrasive and an abrasive liquid to form semi-circular grooves 3, 4, 5, 6 and 7 in the workpiece 2.

This method enables the formation of the grooves 3, 4, 5, 6 and 7 at a mutual distance of only 10 microns with a tolerance of 1 micron. As shown in the enlared partially sectional view 13, the wires (in this case wire 12) are stretched in grooves having a V-shaped cross-section (in this case groove 14). A number of mutually parallel wires are shown in the drawing but it is also possible, of course, to use one wire which is wound around a drum 1 once or a number of times. The figure furthermore shows one workpiece 2 but it is also possible, to arrange a number of workpieces along the circumference of the drum.

How the method can be applied to the manufacture of magnetic heads is shown in FIGS. 2a and 2b and FIGS. 3a and 3b, respectively.

FIG. 2a shows two components of ferrite 16 and 17 which are cemented together to form an assembly 15. In said assembly, grooves 18, 19, 20, 21, 22 are ground by means of the device shown in FIG. 1. As is shown in FIG. 2b, deeper and wider sawcuts 23, 24, 25 and 26 are then made and are filled with a non-magnetic material. Finally, the assembly is severed into a number of magnetically separated head cores 27, 28, 29, 30.

FIG. 3a shows three components of ferrite 31, 32 and 33. In these components, grooves 34, 35, 36; 37, 38; and 39, 40, respectively, are ground by means of the device shown in FIG. 1. FIG. 3b shows the components 31, 32 and 33 after they have been cemented together to form an assembly 41. The assembly may now be severed along the lines 42 and 43 extending centrally through the grooves 34, 38, 40 and 36, 37, 39, respectively. The resulting central portion may then be used as a core for a so-called "tunnel erase" head, which is a head having a writing gap 44 behind which two erasing gaps 45, 46 separated by a "tunnel" (in this case the groove 35) are present when viewed in the direction of tape travel.

What is claimed is:

1. A method of manufacturing the core for a magnetic head comprising the following steps:
    providing a first block of ferrite;
    providing a number of mutually parallel grooves in a surface of said first block of ferrite said grooves being ground by pressing said first block against a rotating drum having a circumferential groove and at least one metal wire disposed in said groove with at least a part of the cross section of said wire projecting above the surface of said drum;
    providing a second block of ferrite; positioning said surface of said first block against a surface of said second block of ferrite
    connecting said first and second blocks with a non-magnetic material intermediate at least portion of said surface of said first block and said surface of said second block;
    severing the resulting assembly into individual head cores by making sawcuts extending parallel to said grooves.

2. A core for a magnetic head manufactured in accordance with the method as claimed in claim 1.

3. A method of manufacturing a core for a magnetic head comprising the following steps:
    providing first and second blocks of ferrite;
    providing a quantity of non-magnetic material;
    connecting together a surface of said first block of ferrite to a surface of said second block of ferrite by means of said non-magnetic material;
    forming a number of mutually parallel grooves extending transversely to the connection surfaces, said grooves being ground by pressing said first block, second block and non-magnetic material against a rotating drum having a circumferential groove and at least one metal wire disposed in said groove with at least a part of the cross section of said wire projecting above the surface of said drum;
    severing the resulting assembly into individual head cores by marking sawcuts extending parallel to said grooves.

4. A core for a magnetic head manufactured in accordance with the method as claimed in claim 3.

* * * * *

UNITED STATES PATENT AND TRADEMARK OFFICE
CERTIFICATE OF CORRECTION

PATENT NO. : 4011692
DATED : March 15, 1977
INVENTOR(S) : Jules Bos et al

It is certified that error appears in the above–identified patent and that said Letters Patent are hereby corrected as shown below:

Column 4, line 29, "marking" should be --making--.

Signed and Sealed this

Fourteenth Day of June 1977

[SEAL]

Attest:

RUTH C. MASON
*Attesting Officer*

C. MARSHALL DANN
*Commissioner of Patents and Trademarks*